United States Patent [19]

Chernosky

[11] 4,306,331

[45] * Dec. 22, 1981

[54] VACUUM CLEANER ATTACHMENT FOR ROTARY LAWNMOWERS

[76] Inventor: Allen A. Chernosky, 4015 Turnberry, Houston, Tex. 77025

[*] Notice: The portion of the term of this patent subsequent to Dec. 7, 1993, has been disclaimed.

[21] Appl. No.: 3,284

[22] Filed: Jan. 15, 1979

Related U.S. Application Data

[60] Continuation-in-part of Ser. No. 680,486, Apr. 26, 1976, abandoned, which is a division of Ser. No. 499,830, Aug. 23, 1974, Pat. No. 3,995,348.

[51] Int. Cl.³ .............................................. A47L 9/00
[52] U.S. Cl. ....................................... 15/328; 15/338; 37/43 L
[58] Field of Search .................. 15/328, 334, 337, 338, 15/344; 37/43L

[56] References Cited

U.S. PATENT DOCUMENTS

| | | | |
|---|---|---|---|
| 2,930,068 | 3/1960 | Evanson et al. | 15/328 X |
| 3,142,913 | 8/1964 | Jacob | 15/328 X |
| 3,286,376 | 11/1966 | Wildes | 15/328 X |
| 3,676,893 | 7/1972 | Smyth | 15/328 |
| 3,872,539 | 3/1975 | Doyel | 15/344 |

*Primary Examiner*—Chris K. Moore
*Attorney, Agent, or Firm*—Jennings B. Thompson; Marvin B. Eickenroht

[57] ABSTRACT

An attachment is disclosed for converting a rotary type lawnmower to a vacuum cleaner for picking up debris, such as grass cuttings, from sidewalks, driveways, and the like. The attachment includes a baffle member for positioning across the opening in the bottom of the housing of the rotary cutter blade. The baffle member has an opening through which air is pulled by the rotating cutter blade to lift and entrain debris from a sidewalk, driveway, or the like, and carry it into the housing for discharge through the discharge port of the housing. Means are provided for releasably attaching the baffle member to the housing so that the baffle can be attached when it is desired for the mower to act as a vacuum cleaner and removed when the mower is to function in the normal manner.

8 Claims, 63 Drawing Figures

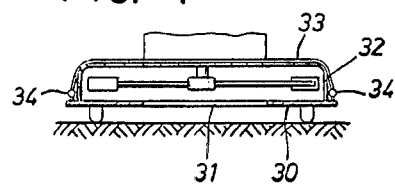
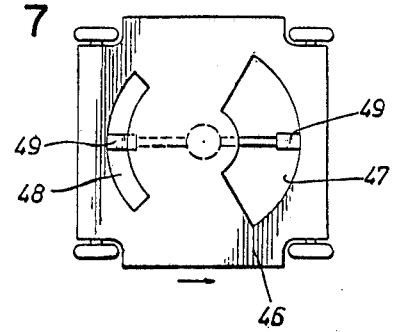
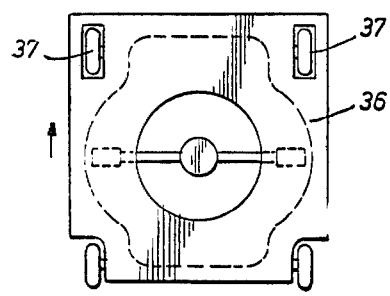
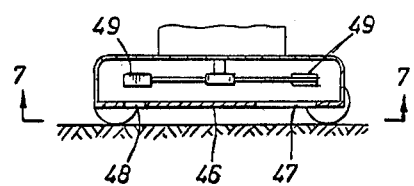
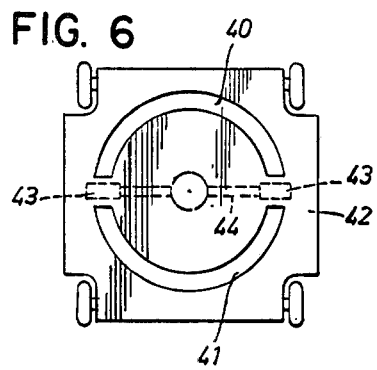
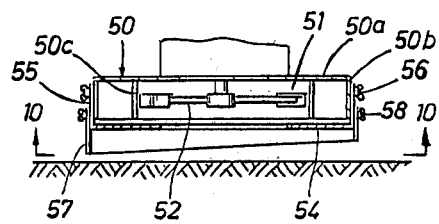
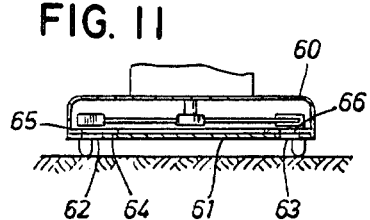
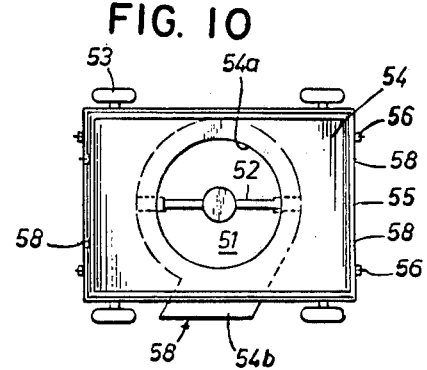

FIG. 12
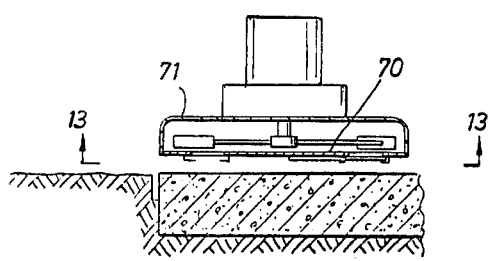
FIG. 14
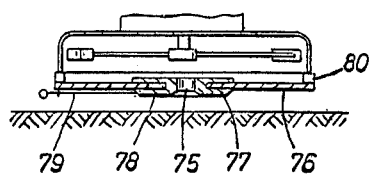
FIG. 13
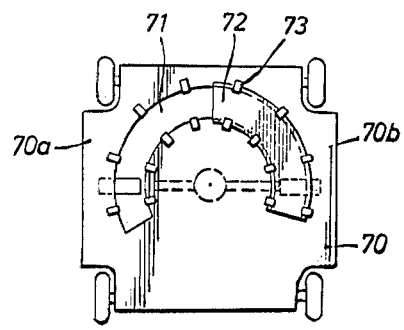
FIG. 15
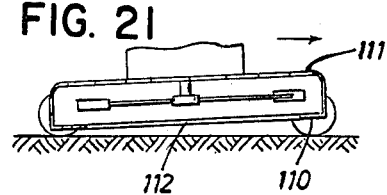
FIG. 21
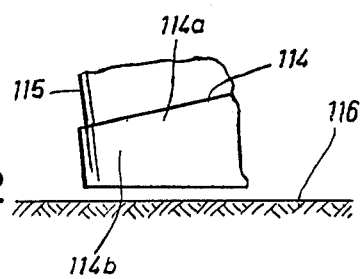
FIG. 22
FIG. 23
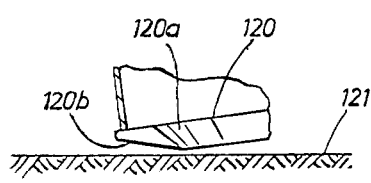
FIG. 24
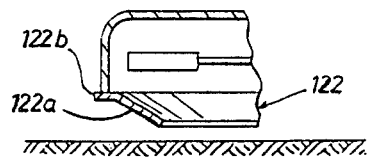

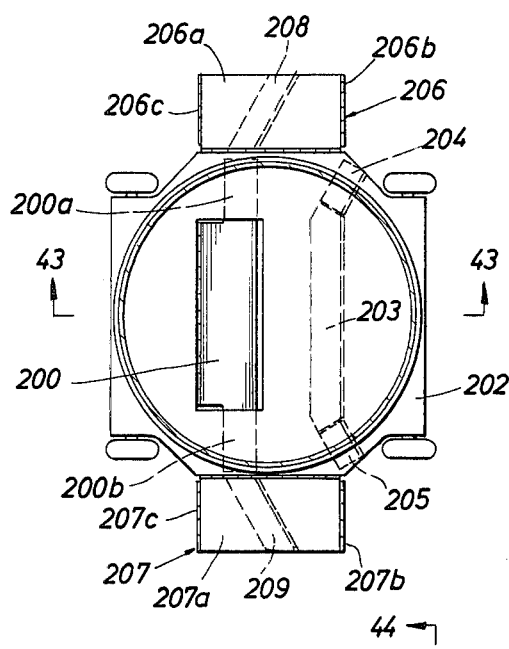
FIG. 42
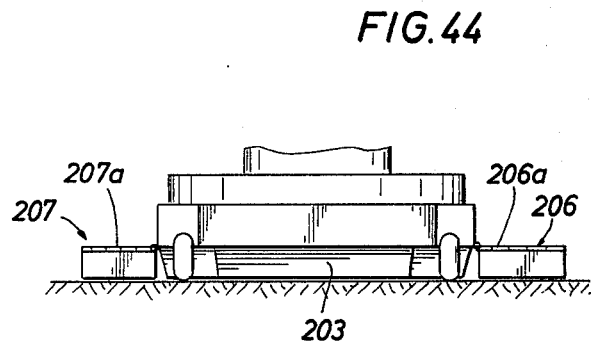
FIG. 44
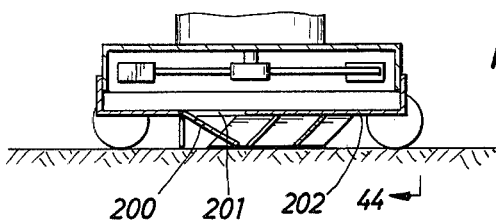
FIG. 43
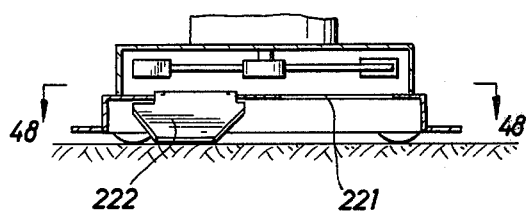
FIG. 47
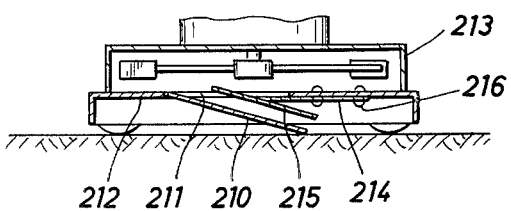
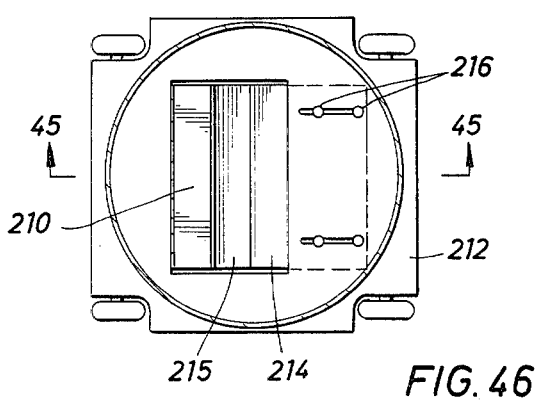
FIG. 46
FIG. 45
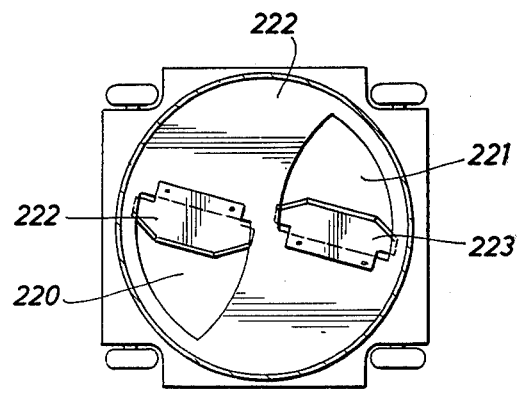
FIG. 48

FIG.49
FIG.53
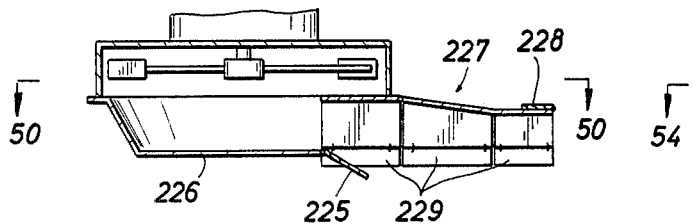
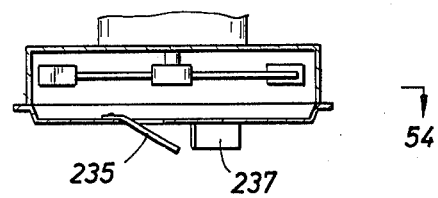
FIG.50
FIG.54
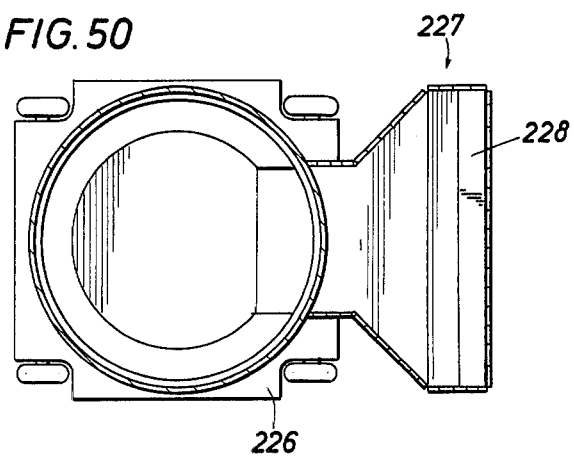
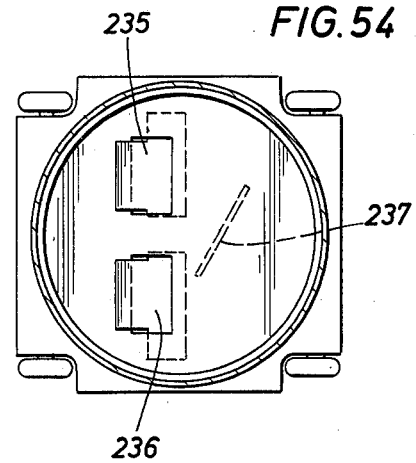
FIG.51
FIG.55
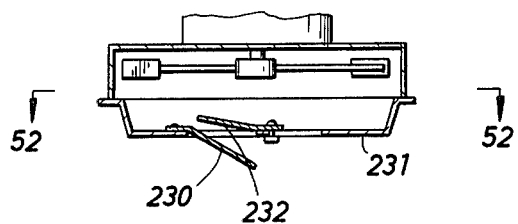
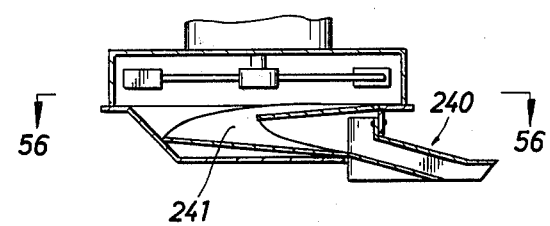
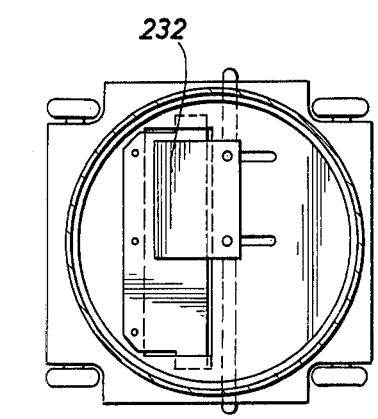
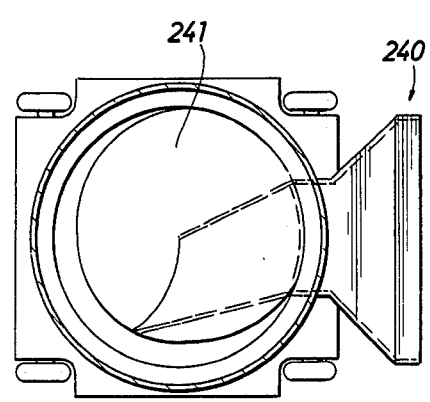
FIG.52
FIG.56

245
246

250a
253
253
250
251 255
252

247

60
60
248

253 250a 251 256
252
255

248

261 260 262 264

VACUUM CLEANER ATTACHMENT FOR ROTARY LAWNMOWERS

This is a Continuation-in-Part of application Ser. No. 680,486, filed Apr. 26, 1976, entitled "Vacuum Cleaner Attachment for Rotary Lawnmower" now abandoned; which is a division of 499,830, filed 8/23/74 and now U.S. Pat. No. 3,995,348, issued 12-7-76.

This invention relates to a lawnmower attachment for converting a rotary type lawnmower to a vacuum cleaner to remove debris from sidewalks, driveways, and the like.

Lawn maintenance usually involves mowing the grass, edging the grass along sidewalks and driveways, and cleaning the cut grass and other debris, such as dirt and leaves, from the sidewalks and driveways. This latter operation is commonly done by sweeping this debris into one or more piles where it can be picked up and removed. There are special vacuum cleaners on the market that can be used for this purpose also.

By far, the majority of lawnmowers in use today are of the rotary type which employ a rotating propeller type blade moving in a horizontal plane to cut grass. The rotating blades of most of these mowers have knife edge cutting surfaces adjacent their outer tips that are flat on bottom and tapered on top so they will act as fan blades and pull air upwardly past the blades. The air so moved is useful in pulling the grass upwardly into the cutting edge of the blade and in pulling the cut grass upwardly into the housing where it can be discharged with the moving air into a receptacle out the side of the mower housing.

There is, however, a considerable amount of turbulence created in the air by such a rotating blade. The moving cutting edge forces some air upwardly but it also pushes air ahead, down, and to the side toward the side wall of the housing. A portion of the air pushed ahead and toward the side walls will move downwardly rather than upwardly. When cutting grass, this air will carry some of the cuttings downwardly out of the housing, but the amount is usually not sufficient to be objectionable. When a mower is moved over a sidewalk or driveway, however, this downward flow of air is very evident, as cuttings, dirt, etc. on these surfaces is scattered to all sides. Some, of course, is pulled up into the housing, but the amount left is such that sweeping is still required.

It is an object of this invention to provide an attachment for rotary type lawnmowers that will convert the lawnmower to a very efficient vacuum cleaner to pick up the debris from a sidewalk, driveway, or the like sufficiently that hand sweeping is not necessary.

It is another object of this invention to provide an attachment for a lawnmower that will direct the flow of air upwardly into the housing of the lawnmower so that little, if any, scattering of the debris, even the very light grass cuttings, will occur.

These and other objects, advantages, and features of this invention will be apparent to those skilled in the art from a consideration of this specification, including the attached drawings and appended claims.

In the drawings:

FIG. 4 is a vertical sectional view of a lawnmower having the attachment of this invention attached thereto, showing an alternate method for attaching the attachment to the mower; and FIGS. 5-63 are views of various alternate embodiments of the attachment of this invention and certain specific features thereof.

Figure 1:
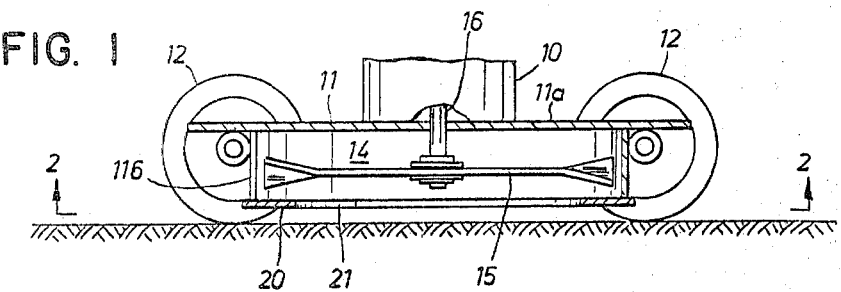
FIG. 1 is a vertical sectional view of a rotary type lawnmower with one embodiment of the attachment of this invention mounted thereon to convert the lawnmower into a very effective vacuum cleaner.

FIG. 1 is a vertical cross section through a typical rotary lawnmower. The mower is shown more or less schematic, and as will be the case in the Figures showing other embodiments of this invention, only the essential parts of the mower and attachment will be shown. The mower of FIG. 1 includes motor 10 mounted on housing 11 which is supported for movement over the ground by wheels 12. Housing 11 includes upper plate 11a which supports the motor and downwardly extending generally cylindrical skirt 11b which combines with plate 11a to form chamber 14 in which is located mower blade 15. Output shaft 16 of motor 10 extends through plate 11a and supports through the opening in the bottom of the housing. The downward flow of air or spillage of air from chamber 14 in the conventional rotary type mower is what causes much of the scatter of debris when a running mower is moved across a sidewalk or the like without the attachment of this invention. By providing the baffle member with the portion extending inwardly, such as the portion of plate 21 between the side wall and the opening in plate 21, so that a portion of the outer tips of the blade are more or less enclosed, much of the air compressed between the tips of the blade and the walls of the housing of the mower will be prevented from flowing downwardly out of chamber 14 to scatter the debris away from the mower. There will, of course, continue to be this compression of air, but the inward flow of air through opening 21 will be such that this air will flow into the upwardly moving stream of air and be carried out of the chamber without causing any extraneous air currents that interfere with the proper vacuuming of a surface, such as a sidewalk.

The size of opening 21 should be such that it is compatible with the opening between plate 20 and the surface being vacuumed through which the air must travel to reach opening 21. This passageway or duct which encircles opening 21 will be referred to herein as the horizontal duct leading to opening 21. It is one that reduces in size as the air moves inwardly toward the opening. In other words, there is less space for the air to flow through adjacent the opening than there is at the outer edge of the plate. Thus, a given volume of air moving through the horizontal duct will increase in velocity as it approaches opening 21, and generally it is desirable that this increase in velocity be maintained as the air moves upwardly through the opening so that the debris entrained in the air will not tend to fall out at this point. Therefore, preferably the size of opening 21 should be such that the velocity of air moving through the horizontal duct is not unduly decreased as it moves through opening 21.

In accordance with this invention, means are provided to releasably attach the baffle member to the housing of the mower when it is desired to convert the mower into a vacuum cleaner for cleaning a sidewalk and the like. In the embodiment shown in FIGS. 1 and 2, and as best seen in FIG. 3, plate 20 is provided with four equally spaced ears 23 to each of which is attached eye bolt 24 and spring 25. Four eye bolts 26 are attached to upper plate 11a and positioned to be above ears 23 when the plate is installed in place under the housing. Each spring has hook 25a to connect to eye bolt 26 and support plate 20 in position across the bottom of the housing. If desired, each ear can be provided with lug 27 to engage the outer surface of the sidewall of the mower housing to hold the plate centered with respect to the housing.

Figure 2:
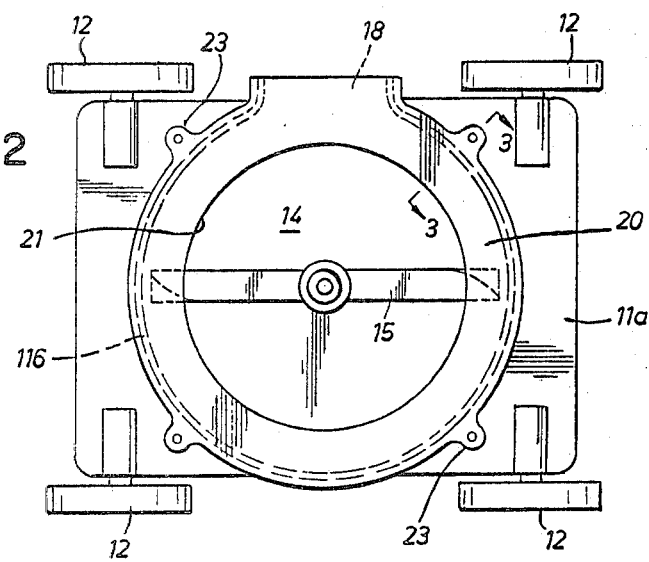
FIG. 2 is a bottom view of the lawnmower of FIG. 1, taken along line 2—2 of FIG. 1.
Figure 3:
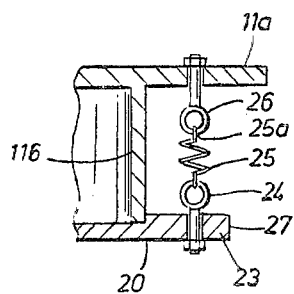
FIG. 3 is a partial sectional view taken along line 3—3 of FIG. 2.

Thus, in accordance with the embodiment in FIGS. 1 and 2, plate 20 can be quickly and easily installed across the open bottom of the housing of the mower by simply hooking springs 25 into the eye bolts provided therefor. The lawnmower is now a vacuum cleaner and can be used to clean debris effeciently from sidewalks, driveways, and the like. When it is desired to use the mower for cutting grass, the plate can be quickly and easily removed by simply unhooking springs 25 from the eye bolts and removing the plate.

FIG. 4 shows an alternate arrangement for removably attaching the baffle member to a lawnmower. In this embodiment, the baffle member includes plate 30 having opening 31. Plate 30 is held in position across the bottom opening of housing 32 of the mower by an elongated flexible strap or cord 33 which extends across the top of mower housing 32 and is connected at opposite ends to eye bolts 34 in plate 30. Preferably, strap 33 is made of elastic material or, alternatively, includes a spring. Two or more of such straps would be used to support the plate in position.

It may be desirable to extend the length of the horizontal duct formed between the surface being vacuumed and the baffle member to increase the tendency to pull debris into the housing, particularly from the side of the mower. Such an arrangement is shown in FIG. 5 where plate 36 extends laterally and forwardly beyond the mower housing, shown dotted. Openings are provided for front wheels 37.

The relationship of the area of the horizontal duct with the opening in the baffle member can be adjusted by changing the shape as well as the size of the opening. For example, two arcuate openings can be used for the baffle opening, such as openings 40 and 41 in plate 42, as shown in FIG. 6. This locates the baffle opening closer to the entrance to the horizontal duct and reduces the amount the horizontal opening is reduced in size before the air reaches the baffle opening. This, in turn, reduces the distance that the debris must be moved laterally to reach the baffle opening as the mower moves across the surface being vacuumed. In addition, this arrangement allows the opening to be positioned directly below cutting edges 43 of cutter blade 44 of the mower thereby getting the most immediate effect from the fan action of the blade.

Where the plate has two openings, such as in the embodiment in FIG. 6, that are substantially the same size, the flow of air into each baffle opening will have substantially the same velocity. It may be desirable to have air flowing at different velocities through the two openings. In FIG. 7, for example, plate 46 is provided with forward opening 47 that is larger than trailing or rearward opening 48. Both openings are generally arcuate in shape and are located so that cutting portions 49 on each end of the blade of the mower pass above the openings. With this arrangement, the velocity of air through opening 48 will tend to be somewhat greater than that through opening 47, and as the mower is moved over the surface being vacuumed, the lighter material, such as dried grass and leaves, will be pulled into front opening 47 and the heavier material, such as small twigs, particles of dirt, wet grass, and the like, will be pulled through opening 48 due to the increased flow of air therethrough which is produced by restricting the opening through which the air flows into the housing of the mower.

An alternate arrangement for controlling the flow of air in the mower housing is shown in FIGS. 9 and 10. In this embodiment, the mower housing is of the type having an inner housing for the cutter blade that is enclosed by an outer housing, which is typical of some mowers. Thus, housing 50 of the mower includes top plate 50a that is generally rectangular in shape. It supports outside vertical walls 50b and an inner vertical wall 50c. The inner wall forms a generally circular chamber 51 in which is located cutter blade 52 of the mower. The outer wall provides support for the bearings and shaft that support wheels 53 of the mower. In this embodiment, the baffle member, which comprises horizontal plate 54, is connected at its outer edges to vertically extending mounting member 55, which is rectangular in shape to extend around the side walls of the housing. Bolts 56 connect the mounting member to the housing in the position shown in FIG. 9, with opening 54a positioned for air to be pulled through the opening into chamber 51 by the rotating cutter blade. In accordance with this embodiment, vertical skirt 57 extends around the mower housing and is attached to mounting member 55. The skirt extends downwardly toward the surface being vacuumed. The purpose of the skirt is to vary the opening into the horizontal duct between plate 54 and the surface being vacuumed so that the flow of air will be greater in one direction than in another. In the embodiment shown, skirt 57 has a lower edge adjacent the surface being vacuumed that tapers upwardly in the direction the mower is normally moved. This provides a larger opening for the air being pulled under the mover from the front and restricts the flow of air coming in under the mower from the rear. By increasing the flow of air from the front, there will be an increase in its turbulence and its ability to entrain debris and carry it into the opening in the plate. The skirt is attached to the mounting plates of the baffle by bolts 58 by providing a slot in the skirt through which the bolts extend. Thus, means are provided to allow the distance between the lower edge of the skirt and the surface being vacuumed to be adjusted as required, depending upon the height of the mower above the ground when the attachment is placed on the mower to convert it to a vacuum cleaner.

In FIG. 10, discharge opening 58 can be seen through which the debris is discharged after it has been picked up into chamber 51. As stated above, usually a porous sack is connected to such discharge ports to collect the debris for disposal somewhere else. In most mowers, the bottom side of such discharge ports is left open. Preferably, the baffle means of this invention, such as plate 54, include a portion 54b that is designed to close the bottom of the discharge port to keep debris from falling out this opening and also to prevent air from being pulled upwardly through the opening.

It may be desirable to improve the ability of the cutter blade to act as a fan by positioning the openings in the baffle member closer to the air deflecting portions of the blade. In the embodiment shown in FIG. 11, the baffle member includes plate 61 having two arcuate openings, such as shown in FIG. 6, which is mounted in position closing the opening in the bottom of housing 60 of the mower. Plate 61 has two arcuate openings 62 and 63 through which the air is pulled into the housing of the mower. Positioned directly above the plate is second plate 64 having openings 65 and 66 that match openings 62 and 63 in plate 61. The thickness of plate 64 can be varied as desired to position the upper end of the openings as close to the air moving portions of the cutter blade as desired.

Where the baffle member is provided with more or less restricted openings that are positioned directly below the cutting portions of the blades as shown in FIGS. 6, 7, 8 and 11, pulses or air are generated by the rotating blade which is very helpful in dislodging debris that is stuck to the surface being vacuumed, such as wet leaves and the like. Thus, the flow of the air in these embodiments is different from the flow of the air that occurs in the embodiment shown in FIG. 5, which tends to moderate the pulsing produced by the rotating blade and produces a much more even flow of air into the housing.

Since the attachment of this invention is particularly useful for converting a rotary lawnmower to a vacuum cleaner to be used to clean up after trimming the edges around sidewalks and driveways, it may be desirable from time to time to increase the vacuuming effect from the side of the lawnmower to help clean the cuttings and the like from the grass adjacent to the sidewalk and also clean out the groove made by the edger blade. In the embodiment shown in FIGS. 12 and 13, the baffle member comprises plate 70 which is attached to housing 71 of the mower in any convenient manner, such as one of the ways described above. In this embodiment, plate 70 is provided with laterally extending portions 70a and 70b having sides parallel to the direction of travel of the mower. Arcuate opening 71 in plate 70 has a center portion that extends across the line of travel of the mower and end portions that are generally parallel to the line of travel. Means are provided to close off a portion of opening 71 to increase the velocity of the air flowing through the portion remaining open. In the embodiment shown, cover 72 is arcuate in shape and is supported by tabs 73 which allow the cover to be moved along the arcuate opening to any desired position to cover up any selected portion of the opening. As shown in FIG. 13, cover 72 is positioned to cover the right hand side of opening 71, thereby increasing the velocity of air flowing laterally between portion 70a of the plate and the sidewalk or driveway, shown in FIG. 12. As positioned, the vacuum cleaner will tend to pull material in from the grass adjacent to the sidewalk and also pick up material directly in front of the mower to some extent. However, the purpose is to improve the ability of the mower to clean the area were the grass has been edged along the side of the walk.

It may also be desirable from time to time to vary the size of the opening in the baffle plate. In the embodiment shown in FIG. 14, opening 75 in baffle plate 76 may be arcuate or rectangular, as desired. It also may be positioned somewhere else with respect to the cutting blades. As shown, it is in the middle more or less of the plate. On each side of opening 75, plate 76 supports members 77 and 78. These members are generally U-shaped in cross section, as shown, and will fit over the edges of the opening to be supported by the plate. Either or both can be arranged to be moved. In the embodiment shown in FIG. 14, arcuate member 78 has handle 79 which is connected thereto and extends out from under the housing to allow an operator to move member 78 either toward or away from arcuate member 77 on the other side of the opening, and thereby change the width of the opening to meet some particular condition. For example, if the mower is being used to pick up a large amount of relatively dry, light, and fluffy grass clippings, then the opening may be increased without losing efficiency. On the other hand, if the debris is relatively heavy and hard to move, then by reducing the size of the opening an increase in air velocity into the housing is obtained to help move this heavier stuff into the housing and off of the surface being vacuumed. In this embodiment, the baffle means includes a generally vertical portion comprising annular spacer 80 which locates baffle plate 76 closer to the surface being vacuumed and also insures that the members 77 and 78 are spaced below the cutter blade of the mower.

With the embodiment described above in connection with FIG. 1, the distance between the baffle member and the surface being vacuumed can be changed only by changing the height of the mower above the ground. In some mowers, this can be done relatively easy, but in others it is more of a problem and inconvenience. Probably, in most cases, the height of the mower for cutting grass will be such that it is too high to do as efficient a vacuuming job as it could do otherwise. Therefore, it is another aspect of this invention to provide an attachment for a mower comprising a baffle member that includes means to increase the depth of the chamber in which the cutter blade is located to move this opening of the baffle member of the attachment closer to the surface being vacuumed. In the embodiment shown in FIG. 15, an attachment for accomplishing this is shown. In this embodiment, baffle plate 81 has forward generally horizontal portion 81a and rearward generally cup-shaped portion 81b. With this arrangement, opening 83 in the rearward portion is located close to surface 82 without having to lower the mower on its wheels. The openings can be shaped in any desired manner, such as one of the ways described above. Opening 84 being in the forward section and spaced further from the surface than opening 83 will tend to pick up the lighter material, much in the way described in connection with the embodiment of FIG. 7. Opening 83 being closer to the surface will tend to have a better chance of picking up the heavier debris. In this regard, opening 84 could be made substantially larger than opening 83, as explained above, to allow the lighter material to be pulled more readily into the housing of the mower. In the embodiment shown in FIG. 15, the openings are rectangular in shape.

In the embodiment shown in FIGS. 16, 17, 18, and 19, an alternate embodiment of the invention is shown that is particularly efficient in lifting relatively heavy debris from the surface being vacuumed. In this embodiment, housing 90 of the mower supports a baffle member that includes horizontal plate 91 and annular vertical flange member 92. As shown, vertical flange 92 extends upwardly inside housing 90 in a position to telescope relative to the housing to allow relative vertical movement of the baffle member and the housing. Plate 91 has rectangular shaped opening 93. Flap 94 is pivotally connected to the trailing or rearward side of opening 93 by hinge 95. Plates 96 and 97 are located at each end of opening 93 to support rod 98 in horizontal slots 99 in each of the supporting plates. In this manner, rod 98 can be moved horizontally in slots 99 to change the angle flap 94 makes with the horizontal, and thus change the extent of opening available in plate 91. Such an adjustment would be made to adjust the flap to the height of the mower above the ground or to improve the flow of air through the opening, or both.

An important feature of flap 94, however, is that it provides inclined surface 94a to support heavy debris as it is moved upwardly in the housing. In other words, if sufficient turbulence can be provided to lift the debris onto inclined surface 94a, usually the upward flow of air along the surface will be sufficient to carry it on into housing 90.

As explained above, in this embodiment baffle plate 91 has vertical annular flange 92 that extends into and telescopes with housing 90. Preferably, annular flange 92 is in sliding engagement with the inside of housing 90 so that the flow of air between the two is held to the minimum. The purpose of such a telescoping fit is to allow the baffle member to move upwardly as required to clear obstructions that it may encounter as it moves over a sidewalk or a driveway.

Figure 16:
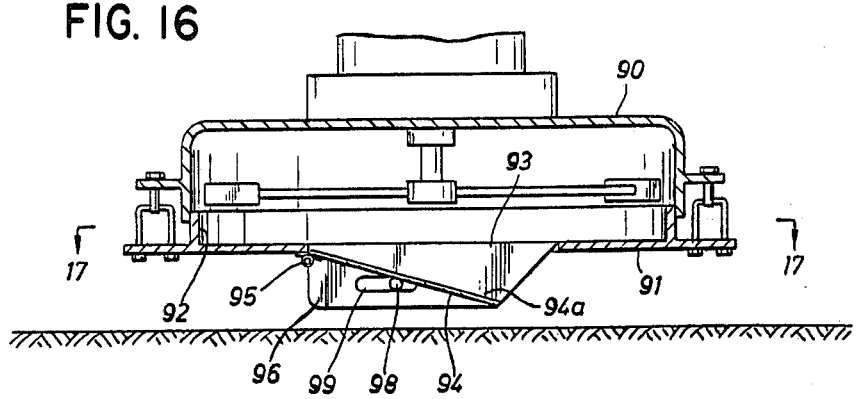
Figure 17:
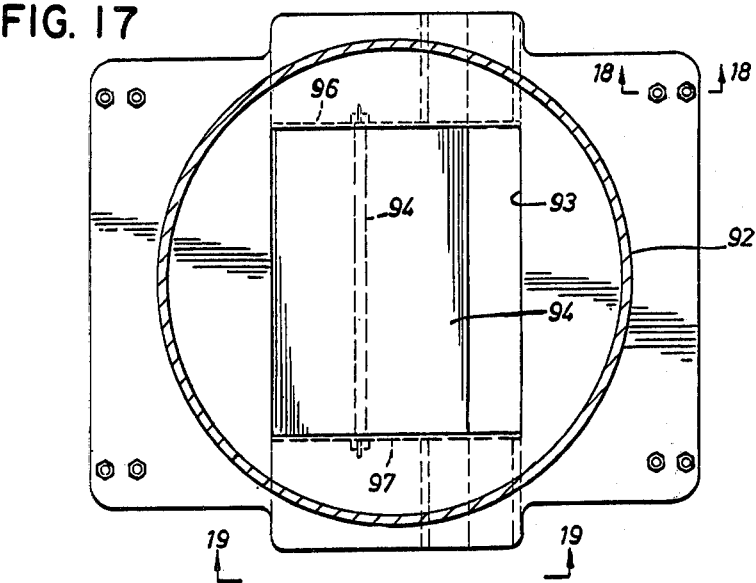
Figure 18:
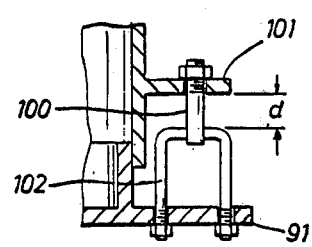

Means are provided to mount the baffle means on the housing to allow such relative movement. The means for so mounting the embodiment shown in FIGS. 16 and 17 is shown in FIG. 18, and includes U-bolt 100, which is attached to outwardly extending flange 101 on housing 90. U-bolt 102 extends through U-bolt 100 and in turn is connected to an extension of plate 91. The distance between the top of U-bolt 102 and plate 101 is the distance that the baffle plate can move upwardly to clear obstructions. This should be made compatible with the height of annular flange 92, of course.

Figure 19:
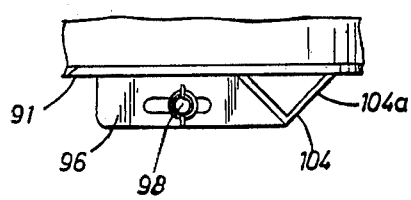
Figure 20:
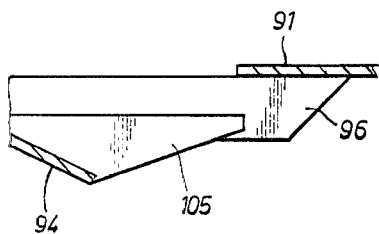

As shown, flap 94 would generally tend to hang up on obstructions rather than move the plate upwardly, therefore skids are provided on each side, or in advance if desired, of the flap to engage the obstructions first and move plate 91 upwardly before the flap engages the obstruction. Two such skids are provided, one of which is shown in FIG. 19. The skids are identical and located on opposite sides of flap 94 in position to move the plate upwardly before the flap gets hung up to the extent that the plate won't move up. The skids are of identical construction, so only the one shown in FIG. 19 will be described. It consists of a generally V-shaped member 104 positioned so that surface 104a, the leading edge of the skid, will cam the plate upwardly when the skid meets an obstruction. Alternatively, skids could be carried by the flap to cam the flap upwardly into opening 93 to pass an obstruction. For example, as shown in FIG. 20, skid plate 105 is attached to the edge of the flap. The skid plate is in sliding engagement with end plate 96 and will cam the flap upwardly when the skid encounters an obstruction.

As explained above in connection with other embodiments of the invention, it is often desirable that the light debris be pulled into the housing toward the front of the housing through an opening that can be spaced further from the surface being vacuumed than the rearward portion of the opening through which the heavier debris is to be pulled into the housing. One simple arrangement for accomplishing this is shown in FIG. 21. Many of the present day lawnmowers are designed so that the height of the housing above the ground can be quickly and easily adjusted without having to remove the wheels and place them in other mounting holes. With this latter type mower, however, the particular embodiment shown in FIG. 21 can be utilized to advantage.

In the embodiment shown, the attachment includes a baffle member comprising plate 110 that is attached across the open bottom of housing 111 of the mower in any convenient manner. Member 110 has opening 112 through which air is drawn in housing 111 by the rotating cutter blade. As shown, the rearward portion of housing 111 has been moved toward the surface being vacuumed by adjusting the rear wheels relative to the housing while leaving the forward wheels supporting the housing at a greater distance from the surface. This in effect positions opening 112 so that it is inclined upwardly in the direction of travel of the mower. This allows the lighter debris to be pulled into the higher forward portion of the opening while the heavier debris is pulled into the lower, rearward portion of the opening.

In FIG. 22, an alternate embodiment of the attachment of FIG. 21 is shown. Only a portion of baffle member 114 adjacent the rear part of housing 115 is shown. Member 114 has a cross section that provides upper surface 114a that is inclined upwardly from the opening in the member to provide an inclined surface to support heavy debris as it is moved into the housing by the moving air. The member also includes lower surface 114b that is designed to be substantially parallel to surface 116 being vacuumed, when the mower is tilted upwardly in front in the manner shown in FIG. 21. With surface 114b generally parallel to the surface being vacuumed, the horizontal duct through which the air flows from the rear of the mower will be substantially uniform in vertical cross section.

In FIG. 23, baffle member 120 is substantially of the same cross sectional shape as baffle 114 of FIG. 21. In this embodiment, however, lower surface 120b is inclined upwardly in a rearward direction so that the cross-sectional area of the horizontal duct formed between this surface and surface 121 being vacuumed decreases rapidly in cross section toward the opening of the baffle member. This provides an increase in the velocity of the air flow as it flows past the lower surface into the opening, thereby increasing its ability to lift heavy debris upwardly onto inclined surface 120a of the baffle member.

The same effect can be obtained with baffle member 122 of FIG. 24. This member is made of a plate of generally uniform thickness to simplify fabrication. It has downwardly inclined annular portion 122a and annular mounting flange 122b.

Preferably, the lower rear bevel edge of the plate in embodiments shown in FIGS. 22 and 23 are located substantially in line with the rear axis of the wheels of the mower. This allows the rear edge of the plate to be positioned very close to the surface being vacuumed, while being easily disengaged from obstructions because it moves directly with the rear wheels. Thus, the lift distance for disengaging the edge with an obstruction is held to a minimum. With the mower inclined, as shown, even with the rear edge of the opening adjacent to or very near the surface being vacuumed, there is plenty of room toward the front end for large debris to enter and to be moved through the opening into the mower. Further, with this rather large opening between the blade of the mower and the surface being vacuumed, the surface is exposed to substantial air turbulence which loosens and entrains pasted down leaves and debris and frees them for movement into the mower housing.

Figure 25:
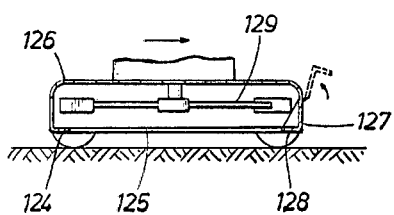

In the embodiment of FIG. 25, baffle member 124 comprises an annular ring having opening 125 that is attached to housing 126 of the mower. In this embodiment, the forward edge of housing 126 is provided with hinged portion 127 having an inwardly extending flange 128 that forms part of baffle member 124 when in the position shown. Should it be desired to cut grass with the mower with the baffle member in place, hinged portion 127 of the housing can be pivoted to the dotted line position shown to allow grass to reach cutter blades 129 through the front of the housing.

Figure 26:
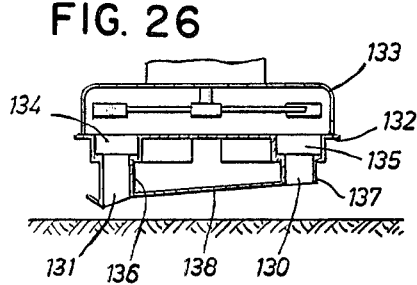

The embodiment of FIG. 26 is designed to provide a forward arcuate opening 130 that is spaced from the surface being vacuumed further than the rearward arcuate opening 131 much like the embodiment shown in FIG. 15. In this embodiment, however, the portion of the baffle member adjacent the ground can move upwardly to clear obstructions that it encounters on the surface being vacuumed. To accomplish this, the baffle member is made in two portions. Mounting portion 132 is attached to housing 133 of the mower, and has two arcuate cavities 134 and 135. Each cavity has a slot in its lower side in which is located arcuate members 136 and 137 in which are located openings 130 and 131, respectively. The two arcuate members are connected together by plate 138 which is inclined upwardly from member 136 to member 137. Should an obstruction engage plate 138, it will move the arcuate members upwardly in cavities 134 and 135 until the obstruction is cleared.

Figure 27:
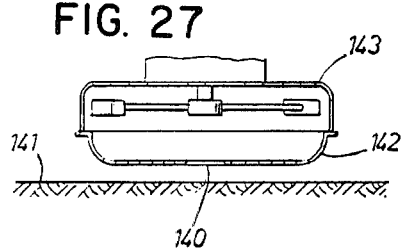

The embodiment of FIG. 27 has the advantage of locating opening 140 close to surface 141 being vacuumed while being of relatively simple structure. Baffle member 142 comprises a bowl shaped member that can be conveniently fabricated and is particularly adaptable for use on circular housings, such as housing 143. This embodiment has the advantages of closing off the lower opening of the housing to convert the lawnmower to a vacuum cleaner, while at the same time lowering the opening to the housing through which the material is drawn, opening 140, to a point near the surface being vacuumed without having to lower the entire mower of its wheels.

Figure 28:
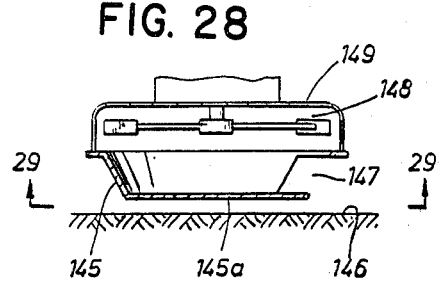
Figure 29:
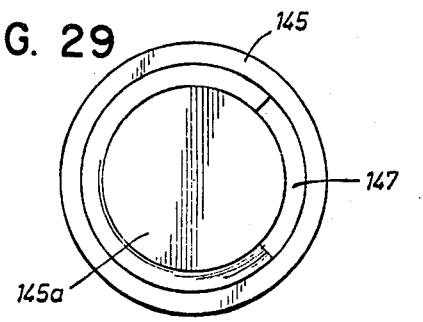

FIGS. 28 and 29 show an alternate embodiment of this invention wherein the opening is substantially vertical so that the debris is pulled along a generally horizontal path into the cavity formed between the baffle and the housing. As shown, baffle member 145 is generally cup shaped having a flat bottom portion 145a that is generally parallel to surface 146 being vacuumed. A window 147 is cut in the upwardly extending sidewall of the cup shaped baffle member to provide the opening through which debris is pulled into cavity 148 formed by mower housing 149 and the baffle member. As stated above, with this arrangement, most of the air will be pulled from in front of the mower, and, thus, tend to pull the debris directly into opening 147 before it is passed over by portion 140a of the baffle member. In this embodiment, the baffle member is generally circular in configuration so opening 147 is more or less arcuate, as shown in FIG. 29. If the housing of the mower is more rectangular than circular, then opening 47 could be made more rectangular also.

Figure 30:
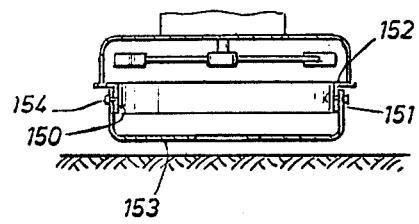

Since mower housings vary in shape and size between the different makers and the different models of each maker, it will be advantageous to provide a mounting adapter for each different type of housing so that the same baffle member substantially can be used with any type of mower housing by simply changing the mounting adapter. As shown in FIG. 30, baffle member, such as baffle member 142 of FIG. 27, is shown attached to mounting adapter 150. The adapter comprises cylindrical portion 151 having outwardly extending substantially horizontal flange 152 attached thereto. The outside diameter of cylindrical portion 151 is designed to mate with baffle member 153 and be attached thereto by mounting bolts 154 which extend through openings in the vertical side wall of the baffle member and engage tapped holes provided in cylindrical portion 151 of the mounting adapter. Flange 152 can be designed for a particular mower housing and such an adapter can be provided for each of the popular mower housings with which the attachment is to be used. In this matter, only one baffle member 153 need be maintained in stock and manufactured, and it can be attached to various shaped mower housings by providing a mounting adapter designed for each such mower.

Figure 31:
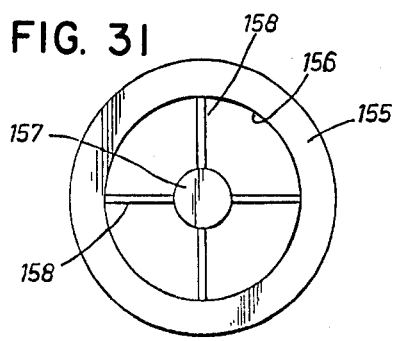

It may be desirable on occasion to provide an opening in the baffle member of this invention that extends 360 degrees but is closed off in the middle. Such an opening is shown in FIG. 31. There a baffle member comprises plate 155 having centrally located opening 156 therein. Mounted in the center of the opening is circular disc 157 to close off the center of the opening. The disc is supported by relatively thin support arms 158 which do not provide substantial interference to the flow of air through the opening. Disc 157, of course, can be of any desired configuration to block off whatever portion of the opening that is desired to block off.

Figure 32:
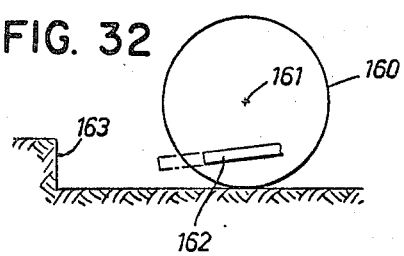
Figure 33:
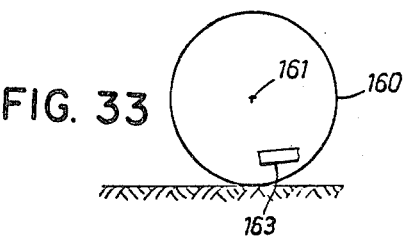

As stated above, mower housings come in all shapes and sizes. The rearward part of the mower housings also vary in position with respect to the axis of rotation of the rear wheels. This is an important consideration in the design of the attachment of this invention, particularly where the rearward portion of the attachment is to be positioned relatively close to the surface being vacuumed. For example, as shown in FIG. 32, rear wheels 160 rotate around axis 161. A portion of baffle member 162 is shown. If the baffle is located as shown in FIG. 32 and the mower is being moved backwardly toward obstruction 163, then rear wheels 160 will engage the obstruction presenting no problem. If, however, the baffle member extends rearwardly beyond the periphery of rear wheels 160, as shown by dotted lines, then it will engage obstruction 163 and stop movement of the mower. This will require lifting of the mower to move the baffle member upwardly far enough to clear the obstruction. Generally, mowers are moved by rotating them around their rear wheels to move the front wheels off the ground. Obviously, with the baffle member engaging the obstruction as it would if extended out to the dotted line position, then rotating the forward end of the mower upwardly around the axis of the rear wheels would accomplish nothing. It would not move the baffle member out of engagement with the obstruction, and in fact, it would move the baffle member downwardly into engagement with the surface being vacuumed. This would interfere further with movement of the mower. Therefore, preferably, the baffle member does not extend rearwardly beyond a vertical plane extending through the axis of rotation of the rear wheels of the mower, as shown in FIG. 33. So positioned, the rear wheels will generally lift the baffle member upwardly over any obstructions it may encounter on moving rearwardly. Further, should the baffle member engage an obstruction that is located between the rear wheels, pushing down on the handle of the mower to rotate the front of the mower upwardly so that the mower can be more easily handled on two wheels will cause the baffle member to move upwardly away from the surface and possibly high enough to clear the obstruction.

Thus, preferably, the baffle member does not extend rearwardly beyond the vertical axis of rotation of the rear wheels, as shown in FIG. 33. If it does, however, it should not extend beyond the periphery of the rear wheels for the reasons given above in connection with FIG. 32.

Figure 34:
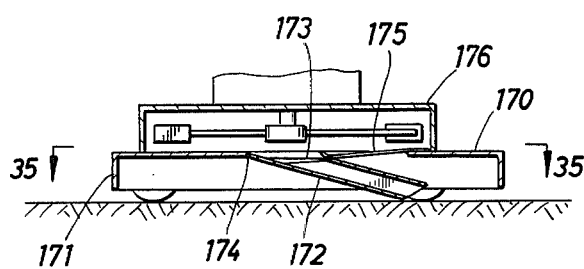
Figure 35:
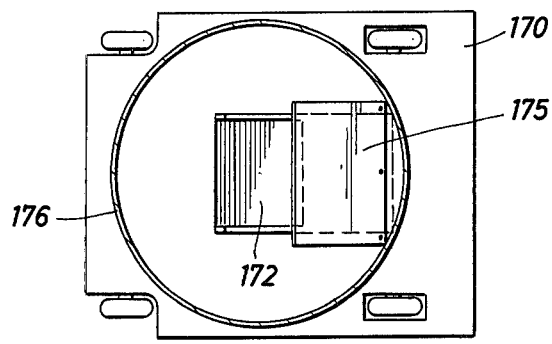

In the embodiment shown in FIGS. 34 and 35, the baffle member includes horizontal plate 170 and skirt or flange 171 that extends downwardly from the periphery of the plate. Conduit or chute like member 172 is pivotally attached to the rear side of opening 173 in plate 170. The conduit is free to pivot around the longitudinal axis of hinge pin 174 as it moves along the ground. Opening 173 is larger than the opening in the upper end of conduit 172 and the portion of the opening between the conduit and plate 170 is closed by plate 175. This plate has one end attached to the horizontal plate 170 and the other end extends across the opening into engagement with conduit 172. To allow the conduit to pivot, this plate is made of thin resilient material that will bend as the conduit moves upwardly as required for its movement over the ground, yet, will maintain contact with the conduit as it moves back to its original position.

Air is pulled into housing 176 of the mower through conduit 172 by the rotating cutting blade. Downwardly extending skirt 171 serves to increase the velocity of the air flowing between the lower edge of the skirt and the surface being cleaned. This improves the ability of this attachment to move relatively large twigs and leaves into position to be picked up by the air flowing through conduit 172.

Figure 36:
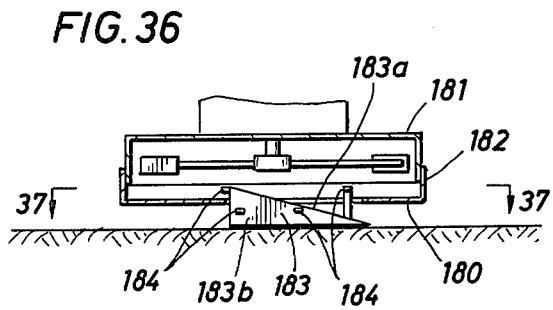
Figure 37:
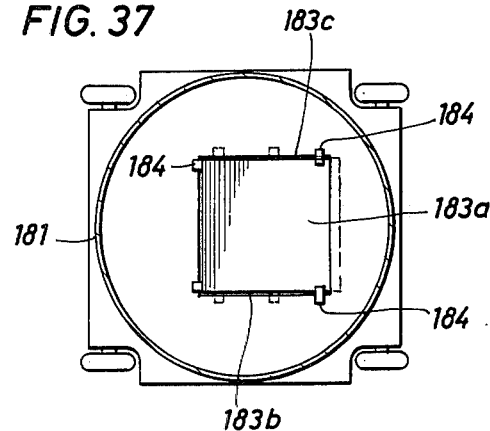

In FIGS. 36 and 37, baffle member 180 is attached to housing 181 of the mower by upwardly extending peripheral flanges 182. Located in an opening provided in baffle member 180 is wedge-shaped member 183. This member is generally U-shaped in cross-section with inclined surface 183a and downwardly extending side members 183b and 183c. The side members ride along the surface of the area being vacuumed and move the wedge-shaped member up and down relative to the baffle member as required by the surface being vacuumed. The movement of the wedge member relative to horizontal plate 180 is limited by tabs 184, which are positioned to limit both the upper and downward travel of the wedge member relative to plate 180. Debris is moved up inclined surface 183 of the wedge-shaped member as the air moves through the opening in the baffle member into the housing of the mower.

Figure 38:
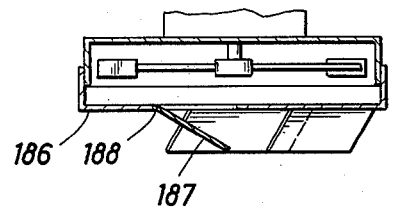
Figure 39:
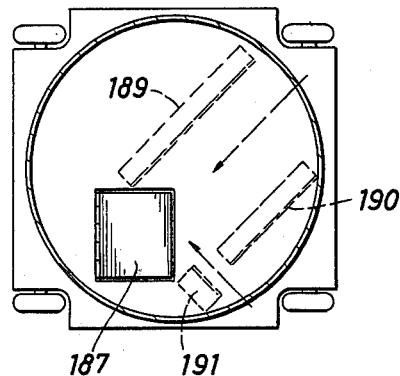

In FIGS. 38 and 39, baffle member 186 has flap 187 pivotally connected to the rear edge of the opening in the baffle by hinge pin 188. The flap pivots downwardly into engagement with the surface being vacuumed. Steps can be provided to limit the downward movement to space the flap from the surface, if desired. Attached to the lower side of baffle 186 are air flow controlling flaps 189, 190 and 191. Preferably, these flaps are pivotally connected to the horizontal plate forming the baffle member so that they will not limit the movement of the mower toward the surface being vacuumed and will also pivot when they engage a fixed object in the path of the mower. In the embodiment shown in FIG. 39, the baffle members are arranged to direct the air toward the opening in the baffle member from two directions, both generally 45° from the direction of travel of the mower. Here the opening in the baffle member and flap 187 is positioned on the right hand side of the longitudinal axis of the mower to obtain the benefit of the more turbulent movement of air caused by placing the opening under the cutting edges of the cutter blade of the mower.

Figure 40:
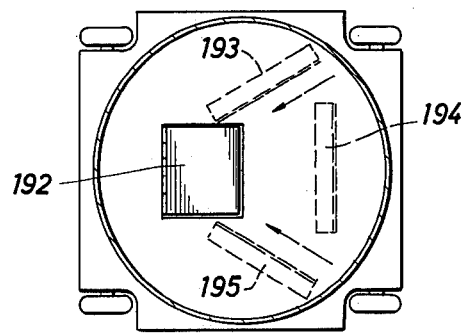
Figure 41:
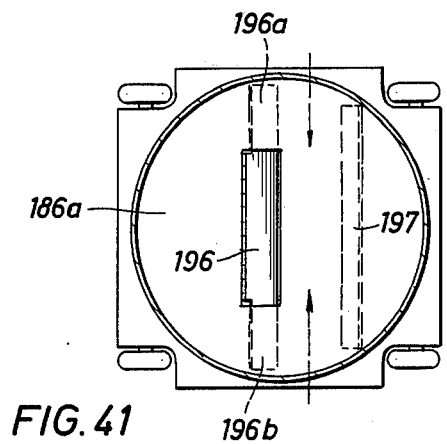

FIGS. 40 and 41 are similar to the embodiment shown in FIGS. 38 and 39. In the embodiment of FIG. 40, flap 192 is positioned generally along the line of travel of the mower and flaps 193, 194 and 195 are positioned to direct the air to the opening from a lateral direction and not from directly in front of the mower.

In the embodiment shown in FIG. 41, flap 196 is provided with lateral extensions 196a and 196b below baffle 186a. The flap with the extensions combine with flap 197 to cause the air to tend to flow to the opening in the baffle from opposite sides of the mower, as indicated by the arrows.

In all of these embodiments, the debris directly in front of the mower will be picked up because it will move under the pivoted flaps, such as flap 194 to be carried up flap 187 into the mower housing by the moving air. The flaps, however, serve to increase the ability of the attachment to move debris that is not directly in the path of the opening into position to be picked up.

The embodiment in FIGS. 42, 43, and 44 is similar to the embodiment in FIG. 41 and is designed to improve the movement of debris laterally into position to be picked up by the attachment. It includes flap 200 which is pivotally connected to the trailing edge of opening 201 in horizontal baffle plate 202. The forward edge of the flap slides along the surface being vacuumed as shown in FIG. 43. The flap has lateral extensions 200a and 200b that extend generally to the edge or horizontal baffle plate 202. Located in front of flap 200 is flap 203. Flaps 204 and 205 are positioned to act as extensions to flap 203 and extend laterally at an angle from flap 203 to help direct the air from the side of the mower into the space between flap 200 and flap 203. Extending laterally from horizontal baffle plate 202 on opposite sides are U-shaped conduits 206 and 207. These conduits comprise horizontal upper plates 206a and 207a, respectively, which are pivotally connected to baffle plate 202. On the forward and trailing edges of plates 206a and 207a are downwardly extending flaps 206b and 206c and 207b and 207c, respectively. The downwardly extending side flaps are pivotally connected to the horizontal plates from which they depend so that they can move out of the way of obstructions and also so they will not limit the movement of the upper plates toward the surface being vacuumed. If desired, the pivotal movement of the top plates can be limited so that they will not pivot downwardly beyond a horizontal position. To further aid the flow of air laterally, flaps 208 and 209 are attached to the bottom side of horizontal plates 206a and 207a. These flaps cooperate with the other flaps described above, to cause the air to move from the side of the mower with a greater velocity than it would otherwise, to thereby improve the movement of debris from the side of the mower into position to be picked up on flap 200 and moved into the housing of the mower.

In the embodiment shown in FIGS. 45 and 46, flap 210 is pivotally connected to the rear edge of opening 211 in plate 212, which acts as the horizontal baffle to close off the lower opening in mower housing 213. In this embodiment, the opening for the air through which the air can move into mower housing 213 is adjustable. This is accomplished by mounting support plate 214 on baffle plate 212 for movement toward or away from flap 210. Support plate 214 carries on its outer and inclined plate 215 which is generally parallel to flap 210 to corporate with the flap to provide a passageway for the air as it moves into the mower housing. Bolts 216 are used to connect support plate 214 to the baffle plate and when loosened, will allow the support plate to be adjusted to provide the desired opening between the plate carried by the support plate and the flap. This allows the velocity of the air moving into the mower housing to be adjusted as required for the volume of air a given mower can pull into its housing.

The embodiment shown in FIGS. 47 and 48 is designed to take advantage of the turbulence created in the air drawn into the mower housing at the cutting edges of the blade. As explained above, when the opening of the baffle plate is around the center of the mower, the turbulence produced by the cutting edges of the cutter is attenuated to some extent and the flow of air into the housing is relatively smooth. Where the opening is directly below the path of the cutting edge of the blade, however, a pulsating flow of air is produced. This aids in the picking up of large debris or debris that is wet and tends to stick to the surface being cleaned. In the embodiment shown in these figures, openings 220 and 221 are located in baffle plate 222 so that the cutting edge of the blades passes over the openings. Located in the openings are flaps 222 and 223. These flaps are pivotally connected to baffle plate 224 and extend downwardly in the opposite direction from which the blade rotates to act as inclined planes to assist the movement of the debris into the mower housing.

In the embodiment shown in FIGS. 49 and 50, flap 225 is pivotally connected to the edge of the opening in horizontal plate 226 of the baffle member. Extending outwardly from the opening in the baffle member is U-shaped conduit 227, which is shaped in the manner shown in FIG. 50. This increases the effective width that the mower can clean. If it is desired to increase the velocity of the air through the conduit, flap 228 which is pivotally connected to the forward end of the conduit can be pivoted into position at least to partially close the opening and increase the velocity of the air.

Along the lower edge of the conduit are provided flaps 229 which are pivotally connected to the lower edge of the conduit and serve to engage the surface being vacuumed and limit as much as possible the amount of air that comes in under the conduit from the side.

In the embodiment shown in FIGS. 51 and 52, flap 230 is connected to baffle 231 and functions in the manner of the flap described above. In this embodiment, however, cover plate 232 is connected to plate 231 and can be moved toward or away from the flap to vary the opening between the cover member and the flap. This allows the flow of air to be adjusted for the particular mower and the conditions under which the attachment is being used.

In the embodiment shown in FIGS. 53 and 54, the baffle plate is provided with two openings on each side of the center line of the mower and flaps 235 and 236 are mounted in the openings. Diverting flap 237 is connected to the baffle plate and positioned as shown in FIG. 54 to cause the air to move laterally on either side of the baffle plate toward the openings in the baffle member. This embodiment is particularly designed to remove the effects of the dead space along the center line of the lawn mower where the volume of air moved by the blades is reduced.

In the embodiment shown in FIGS. 55 and 56, conduit 240 is connected to the baffle member to discharge onto an inclined ramp that spirals upwardly from the opening in the conduit to a level approximately equal to the bottom of the housing of the mower, the inclined ramp is indicated by the number 241. With this arrangement, the debris moving out of conduit 240 is provided with an inclined surface to support the debris as it is moved into the mower housing.

Figure 57:
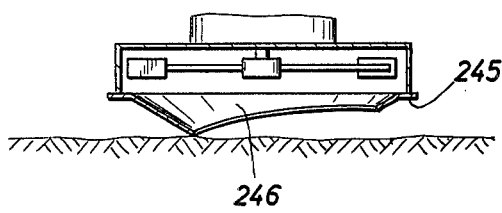

In the embodiment shown in FIG. 57, the baffle member includes horizontal rim portion 245 and inclined or conically-shaped portion 246. The opening is cut in the conically-shaped portion of the baffle member, so that at the rear, the inclined wall extends substantially into contact with the surface being vacuumed, whereas, at the forward end, the lower edge of the wall is substantially spaced from this surface. Thus, with this type baffle member, an inclined surface at the rear is provided by the inclined wall section 246 and the air is caused to flow from the forward area of the mower into the opening and up the inclined rearward surface into the housing.

Figure 58:
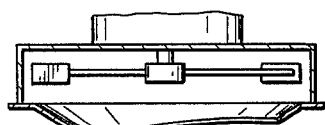

The embodiment in FIG. 58 is substantially the same as that in FIG. 57 with the exception that the rearward inclined portion does not extend to the ground but is supplied with pivoted flap 247, which acts as an extension of the inclined rearward surface but one that can adjust to varying surfaces over which it travels.

Figure 59:
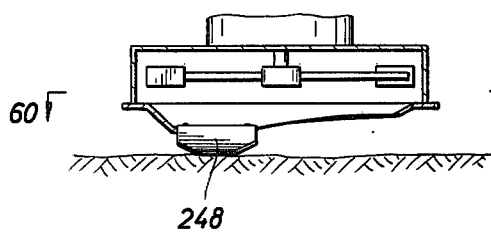
Figure 60:
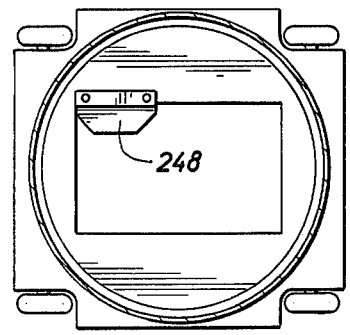

The embodiment in FIGS. 59 and 60 is basically the same as that of FIG. 58 except flap 248 is positioned to extend laterally to again take advantage of the tendency of the cutting edges of the blades to cause turbulence and to improve the ability of the blades to cause the debris to move up the flap. Flap 248 serves the same purpose as flap 247 but is positioned more directly under the cutting edge portion of the blades.

Figure 61:
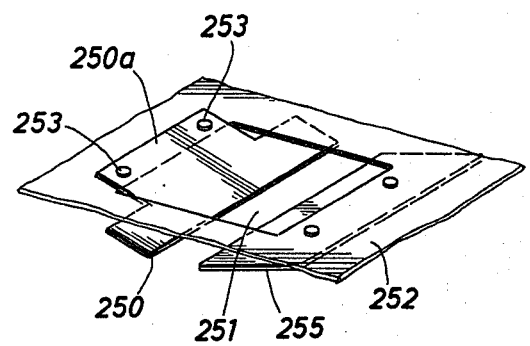
Figure 62:
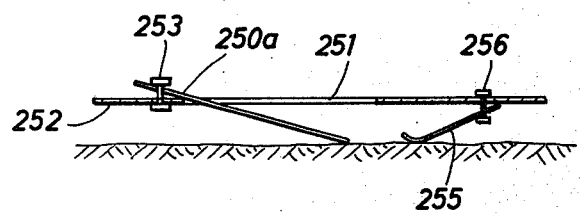
Figure 63:
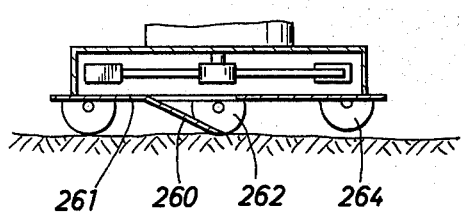

FIGS. 61 and 62 illustrate the preferred method of attaching the flaps to the horizontal portion of the baffle member. As shown, flap 250 has portion 250a that extends through the opening 251 in plate 252. As best seen in FIG. 62, bolts 253 extend through openings provided in portion 250a of the flap and openings provided in baffle plate 252. The weight of the flap, as shown in FIG. 63, will hold the nut up against the bottom of plate 252. Should it be necessary for the flap to pivot upwardly, it will be free to do so and not be restrained by the nut. The nut, in effect, can act as an adjustment to determine the maximum angle that the flap extends downwardly from the plate and also as a hinge allowing the flap to freely pivot upwardly from the maximum angle. Air diverting flap 255 is connected in somewhat the same way to plate 252 by bolts 256. The degree of tightness of the bolt will determine the angle between flap 255 and the plate, and also limit the downward travel of the flap relative to the plate, while allowing the flap to pivot upwardly as required.

In the embodiment shown in FIG. 63, flap 260 is fixed to baffle plate 261. One or more wheels 262 are positioned preferably with their axle in vertical alignment with the forward end of the flap, to keep the flap the desired distance above the surface being cleaned. For ease of operation, wheels should be adjusted to combine with rear wheels 263 to support the mower, holding front wheels 264 above the surface being cleaned.

In all of the embodiments employing flaps to provide an inclined surface to raise the debris into the mower housing, the lower edges may be beveled as are the lower edges of flap 248 in FIGS. 59 and 60. These beveled edges act as skids that will raise the flap upwardly over obstructions the flap may encounter.

If the flaps are relatively light, it is possible for the air being pulled into the mower housing by the cutter blade to move the flap upwardly into the path of the cutter blade. To prevent this means for limiting the upward movement of the pivotal flap should be provided. Flap extensions 196a and 196b serve this purpose in the embodiment shown in FIG. 41, as well as the function of directing air described above. For stop purposes only, the extensions could be much shorter and only one would be required.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many as possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A removable attachment for converting a rotary mower to a vacuum cleaner for picking up debris from sidewalks, driveways, and the like, where the mower has a propeller type grass-cutting blade rotating in a housing having a discharge port and an opening in the bottom thereof through which grass normally extends to be cut by the rotating blade, said attachment comprising a baffle member extending across the opening in the housing and having an opening therein smaller than the opening in the housing, said baffle member including a flap member attached to the baffle member and extending under the opening, said flap member being inclined downwardly to provide an inclined surface up which debris can be moved into the opening by air pulled through the opening by the rotating blade of the mower, means attaching the flap member to the baffle member for pivotal movement around a horizontal axis to allow the flap member to pivot toward and away from the baffle member as required by the surface over which the mower is moving, and means for releasably attaching the baffle member to the housing to restrict the flow of air between the member and the housing sufficiently to cause most of the air pulled into the housing by the blade to flow through the opening.

2. The attachment of claim 1 further provided with stop means to limit the angle through which the flap member may pivot away from the opening.

3. The attachment of claim 2 in which the stop means are adjustable to allow the maximum angle between the flap member and the baffle member to be adjusted.

4. The attachment of claim 1 in which the opening includes two arcuate openings which are generally concentric with the axis of rotation of the blade.

5. The attachment of claim 1 further provided with a generally cylindrical skirt member extending downwardly a uniform distance from the periphery of the housing toward the ground to provide a narrow space through which the velocity of the air is increased as it moves inwardly toward the opening.

6. The attachment of claim 1 in which said baffle member is located in line with or ahead of the axis of rotation of the rear wheels of the mower.

7. A rotary mower vacuum cleaner for picking up debris from sidewalks, driveways, and the like, comprising a mower having a propeller type blade rotating in a housing having a discharge port and an opening in the bottom thereof through which grass normally extends to be cut by the cutting edges adjacent the ends of the rotating blade, a baffle member having an opening therein smaller than the opening in the housing closing off a portion of the bottom opening in the housing, said baffle member including a plate for closing the opening in the bottom of the mower housing, said plate having an opening located with a substantial portion of the opening directly below the path of the cutting edges of the blades and a flap member attached to the plate and inclined downwardly below the opening so that air is drawn by the rotating mower blade into the mower housing which will carry debris from the surfaces being vacuumed up the inclined surface of said flap member and into the housing.

8. The rotary mower vacuum cleaner of claim 7 further provided with a skirt member extending downwardly from the plate to provide a narrow space between the lower edge of the skirt and the surface being vacuumed to increase the velocity of the air pulled through the space by the rotating blade of the mower to better dislodge debris from the surface being vacuumed.

* * * * *